US 8,565,188 B2

(12) United States Patent
Lin et al.

(10) Patent No.: US 8,565,188 B2
(45) Date of Patent: Oct. 22, 2013

(54) MINIMIZING CALL DROPS DURING A SERVING CELL CHANGE

(75) Inventors: Yun Lin, San Diego, CA (US); Bhadarinath B. Manjunath, Carlsbad, CA (US); Prashanth Sharma, San Diego, CA (US); Liang Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 12/974,886

(22) Filed: Dec. 21, 2010

(65) Prior Publication Data

US 2012/0155429 A1 Jun. 21, 2012

(51) Int. Cl.
*H04W 4/00* (2009.01)
*H04W 36/00* (2009.01)

(52) U.S. Cl.
USPC ............ 370/331; 370/328; 455/436; 455/437

(58) Field of Classification Search
CPC . H04W 36/00; H04W 36/08; H04W 28/0226; H04W 80/04
USPC .......... 370/310, 328–332; 455/422, 436, 439, 455/437, 443
See application file for complete search history.

(56) References Cited

U.S. PATENT DOCUMENTS

| 7,245,919 | B2* | 7/2007 | Lau et al. | 455/450 |
| 2005/0243762 | A1* | 11/2005 | Terry et al. | 370/328 |
| 2007/0109986 | A1* | 5/2007 | Kwak et al. | 370/316 |
| 2008/0261599 | A1* | 10/2008 | Mohanty et al. | 370/331 |
| 2011/0014917 | A1* | 1/2011 | Wager et al. | 455/438 |
| 2011/0028151 | A1* | 2/2011 | Wager | 455/436 |

FOREIGN PATENT DOCUMENTS

WO WO2010111654 9/2010

OTHER PUBLICATIONS

Ericsson: "HS-PDSCH Serving Cell Change Enhancements", 3GPP Draft; R1-081544, 3rd Generation Partnership Project (3GPP), Mobile Competence Centre; 650, Route Des Lucioles; F-06921 Sophia-Antipolis Cedex; France, vol. RAN WG1, no. Shenzhen, China; 20080327, Mar. 27, 2008, XP050109957, [retrieved on Mar. 27, 2008].
International Search Report and Written Opinion—PCT/US2011/066664—ISA/EPO—Mar. 21, 2012.
QUALCOMM Europe, Improving Reliability of HS-PDSCH Serving Cell Change Procedure, 3GPPTSG-RAN WG1 #52, R1-080815, Feb. 11, 2008, pp. 1-8. XP002498399.

* cited by examiner

*Primary Examiner* — Ayaz Sheikh
*Assistant Examiner* — Mariela Vidal Carpio
(74) *Attorney, Agent, or Firm* — Charles Chesney

(57) ABSTRACT

A method for minimizing call drops during a serving cell change is disclosed. A first measurement report message is received from a user equipment (UE) requesting to change an active set of the UE. A second measurement report message is received from the UE indicating a change of a best cell and requesting a change of a serving cell to a target cell. The second measurement report message is processed before the first measurement report message is completely processed.

30 Claims, 12 Drawing Sheets

US 8,565,188 B2

MINIMIZING CALL DROPS DURING A SERVING CELL CHANGE

TECHNICAL FIELD

The present disclosure relates generally to communication systems. More specifically, the present disclosure relates to minimizing call drops during a serving cell change.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

Wireless communication systems are widely deployed to provide various types of communication content such as voice, video, data and so on. These systems may be multiple-access systems capable of supporting simultaneous communication of multiple wireless communication devices with one or more base stations.

When moving, a mobile device may perform a handoff, i.e., transitioning from communication with a first base station to a second base station. This may involve various signaling between the mobile device and network devices. However, in certain circumstances, signaling used for handoff may not be received or processed correctly, causing dropped calls. Therefore, benefits may be realized by minimizing call drops during a serving cell change.

SUMMARY OF THE INVENTION

A method for minimizing call drops during a serving cell change is disclosed. A first measurement report message is received from a user equipment (UE) requesting to change an active set of the UE. A second measurement report message is received from the UE indicating a change of a best cell and requesting a change of a serving cell to a target cell. The second measurement report message is processed before the first measurement report message is completely processed.

In one configuration, an active set update message may be sent to the user equipment (UE) based on the first measurement report message. The processing of the second measurement report message may include sending orders to the target cell to become the serving cell for the user equipment (UE) before receiving an active set update complete message from the UE. The first measurement report message may be one or more of the following: an event 1A that requests a cell be added to the active set of the user equipment (UE), an event 1B that requests a cell be removed from the active set of the UE and an event 1C that requests that a cell be replaced in the active set of the UE with another cell. The second measurement report message may be an event 1D requesting that the serving cell be changed to the target cell.

The active set update message may be re-sent to the user equipment (UE), if no layer 2 acknowledgment of the active set update message is received within a threshold time, via the target cell after the target cell becomes the serving cell. Channel quality indicators (CQIs) for the source cell may be received before the target cell becomes the source cell. CQIs for the target cell may be received after the target cell becomes the source cell. The serving cell change may be an Enhanced Serving Cell Change (ESCC) procedure in a High-Speed Downlink Packet Access (HSDPA) system.

An apparatus for minimizing call drops during a serving cell change is also disclosed. The apparatus includes a processor and memory in electronic communication with the processor. Executable instructions are stored in the memory. The instructions are executable to receive a first measurement report message from a user equipment (UE) requesting a change to an active set of the UE. The instructions are also executable to receive a second measurement report message from the UE indicating a change of a best cell and requesting a change of a serving cell to a target cell. The instructions are also executable to process the second measurement report message before completely processing the first measurement report message.

A radio network controller for minimizing call drops during a serving cell change is also disclosed. The apparatus includes means for receiving a first measurement report message from a user equipment (UE) requesting a change to an active set of the UE. The radio network controller also includes means for receiving a second measurement report message from the UE indicating a change of a best cell and requesting a change of a serving cell to a target cell. The radio network controller also includes means for processing the second measurement report message before completely processing the first measurement report message.

A computer-program product for minimizing call drops during a serving cell change is also disclosed. The computer-program product comprises a non-transitory computer-readable medium having instructions thereon. The instructions include code for causing a radio network controller to receive a first measurement report message from a user equipment (UE) requesting a change to an active set of the UE. The instructions also include code for causing a radio network controller to receive a second measurement report message from the UE indicating a change of a best cell and requesting a change of a serving cell to a target cell. The instructions also include code for causing a radio network controller to process the second measurement report message before completely processing the first measurement report message.

DETAILED DESCRIPTION

Figure 1:
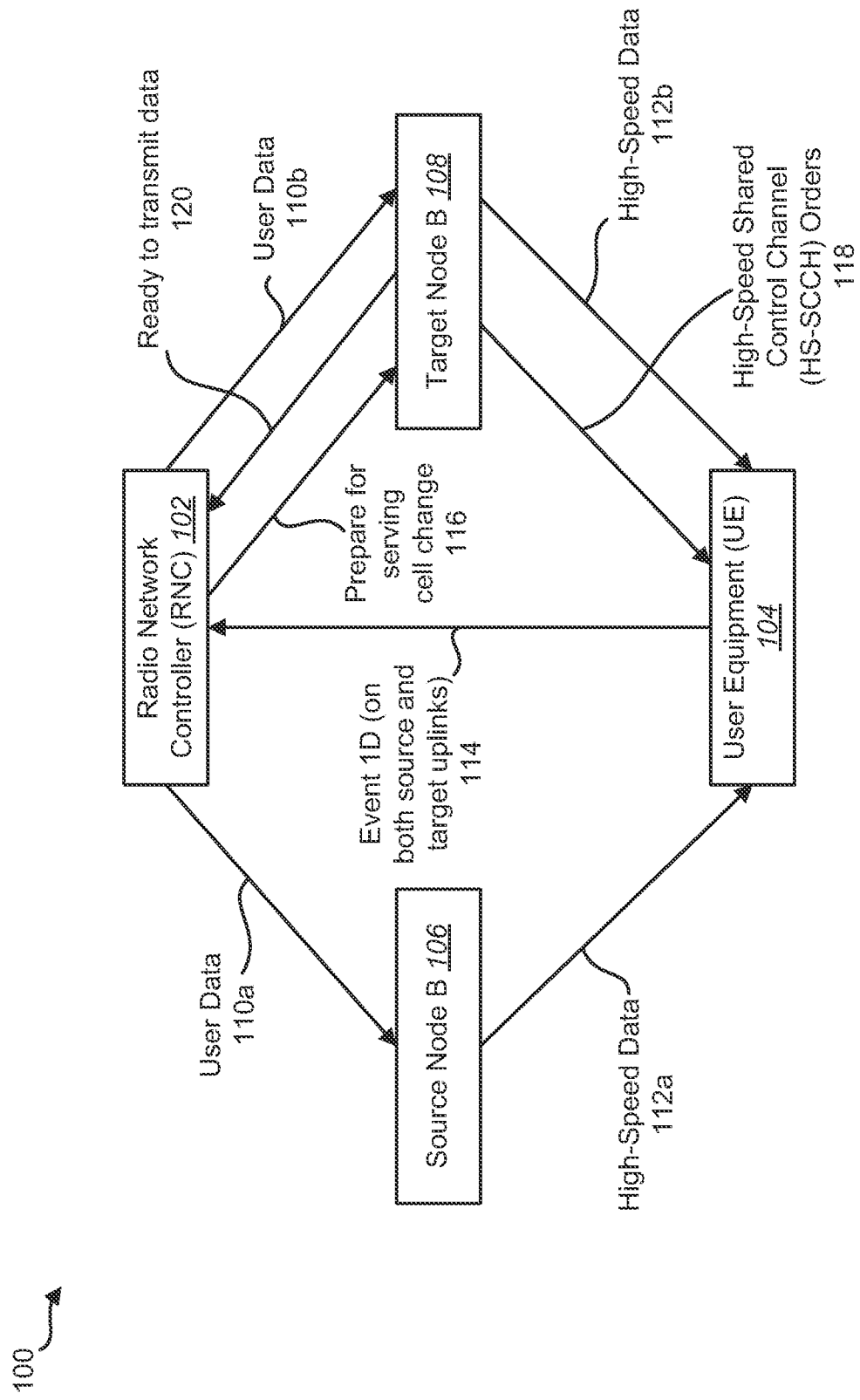
FIG. 1 is a block diagram illustrating an Enhanced Serving Cell Change (ESCC) procedure in a wireless communication system.

FIG. 1 is a block diagram illustrating an Enhanced Serving Cell Change (ESCC) procedure in a wireless communication system 100. The system 100 may include a radio network controller (RNC) 102, one or more user equipments (UEs) 104, one or more source node Bs 106 and a target node B 108. As used herein, the term "user equipment" (UE) refers to an electronic device that may be used for voice and/or data communication over a wireless communication system 100. Examples of user equipments (UEs) 104 include cellular phones, personal digital assistants (PDAs), handheld devices, wireless modems, laptop computers, personal computers, etc. A user equipment (UE) 104 may alternatively be referred to as an access terminal, a mobile terminal, a mobile station, a remote station, a user terminal, a terminal, a subscriber unit, a mobile device, a wireless device, a wireless communication device, a subscriber station or some other similar terminology.

The term "node B" refers to a wireless communication station that is installed at a fixed location and used to communicate with wireless communication devices, such as user equipment (UEs) 104. A node B 106, 108 may alternatively be referred to as an access point, a base station, an evolved node B or some other similar terminology. Each node B 106, 108 provides communication coverage for a particular geographic area. A node B 106, 108 may provide communication coverage for one or more UEs 104. The term "cell" can refer to a node B 106, 108 or a portion of a node B 106, 108, e.g., a node B 106, 108 may include multiple cells that each provide communication coverage for a portion of the total geographic area serviced by the node B 106, 108. Furthermore, the terms "serving" and "source" refer to a node B 106 or cell that is currently delivering user data to a user equipment (UE) 104. The term "target" refers to a node B 108 or cell that is desired by the user equipment (UE) 104 and/or the radio network controller (RNC) 102 to become the source/serving node B 106 or cell.

The system 100 may operate using Universal Mobile Telecommunications System (UMTS). In order to increase cell capacity and reduce over-the-air transmission time of signaling messages, UMTS allows mapping of signaling radio bearers (SRBs) to the High-Speed Shared Data Channel (HS-DSCH). However, since there is no macro cell diversity (or soft/softer handover) on the HS-DSCH, signaling transmissions may fail when communication with the serving cell is deteriorating fast. This may cause an increase of call drops during serving cell change, especially in a dynamic radio environment.

To reduce call drops during High-Speed Download Packet Access (HSDPA) serving cell change, Enhanced Serving Cell Change (ESCC) may be used to eliminate Layer 3 signaling channel reconfiguration messages and replace it with a faster and more robust Layer 1 procedure. While illustrated using ESCC, the present systems and methods may be used with other serving cell change procedures.

During ESCC, the radio network controller (RNC) 102 may send user data 110a to the source node B 106. The source node B 106 may send high-speed data 112a to the user equipment (UE) 104, i.e., the source node B 106 may send the user data 110a using HSDPA. At some point, the user equipment (UE) 104 may determine that another cell is better than the source cell 106 and send an event 1D 114 to the radio network controller (RNC) 102 via the source and target uplinks. After receiving the event 1D, the radio network controller (RNC) 102 may decide whether perform a serving cell change. Then, instead of sending an HSDPA channel reconfiguration message on the source cell 106 HSDPA link, the radio network controller (RNC) 102 may instruct 116 the target node B 108 to prepare for a serving cell change and to send High-Speed Shared Control Channel (HS-SCCH) orders 118 that instruct the user equipment (UE) 104 to start a serving cell change. Once configured, the target node B 108 may notify 120 the radio network controller (RNC) 102 that it is ready to transmit data. Thereafter, the radio network controller (RNC) 102 may send user data 110b to the target node B 108 and the target node B 108 may send high-speed data 112b to the user equipment (UE) 104, i.e., the target node B 108 may send the user data 110b using HSDPA. This new serving cell change method (ESCC) may avoid message loss when the source cell 106 has a fast deteriorating downlink, and thus reduces chance of call drops.

Figure 2:
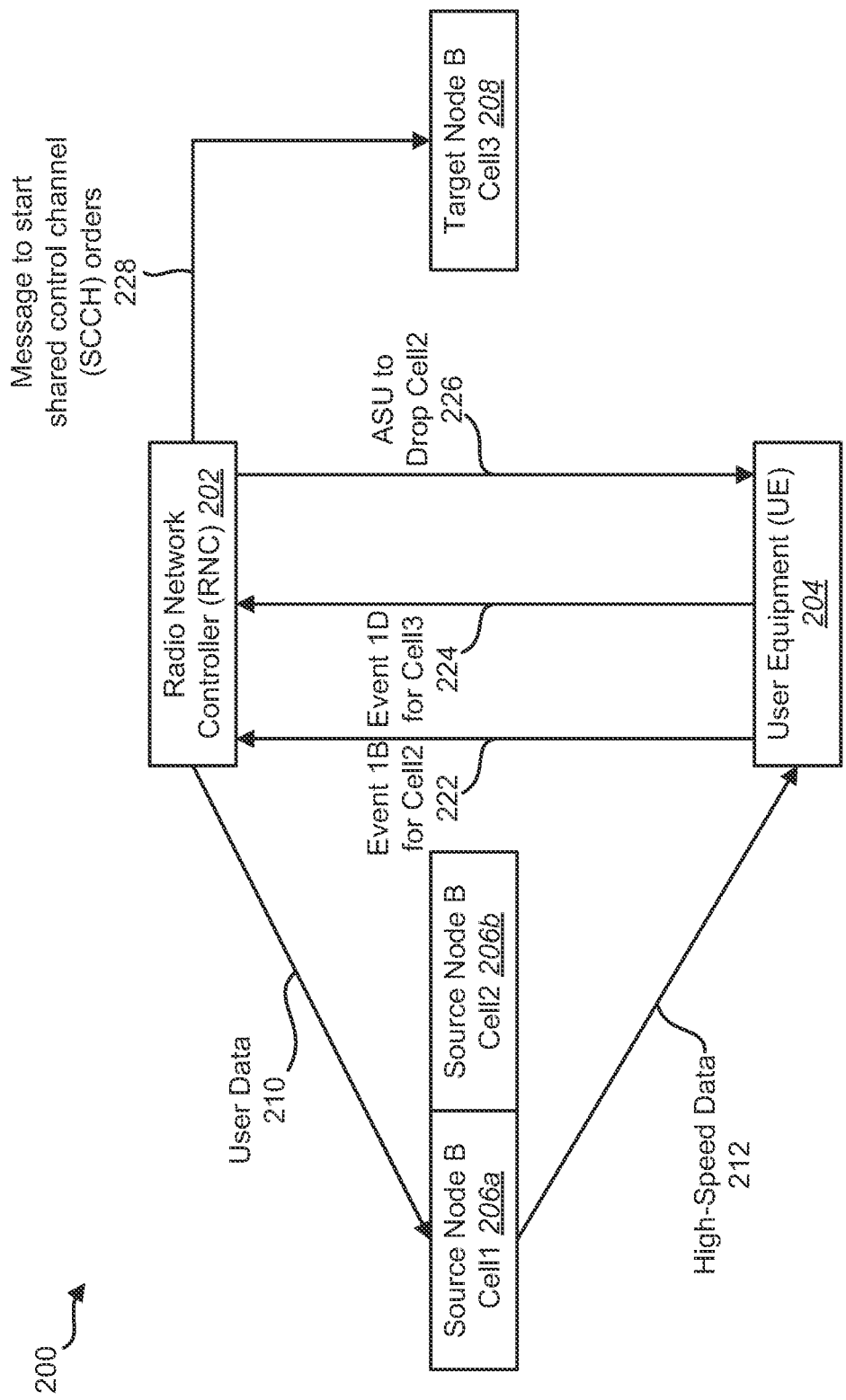
FIG. 2 is a block diagram illustrating another Enhanced Serving Cell (ESCC) procedure in a wireless communication system.

FIG. 2 is a block diagram illustrating another Enhanced Serving Cell Change (ESCC) procedure in a wireless communication system 200. The system 200 may include a radio network controller (RNC) 202, one or more user equipments (UEs) 204, a source node B 206a-b and a target node B 208. The source node B 206a-b may have multiple cells, with cell 206a being the high-speed serving cell and cell2 206b being a non-serving cell 206b. Additionally, cell3 208 is in a target node B 208 and is the target cell. Based on signal strength measurements at the user equipment (UE) 204, there may be three cells in the active set, i.e., cell 206a, cell2 206b and cell3 208. User data 210 may be sent to the source node B cell 206. Signaling Radio Bearers (SRBs) may be mapped on to the High-Speed Downlink Shared Channel (HS-DSCH). So, all the dedicated control messaging from Layer 3 and non-access stratum (NAS) as well as user data 210, may be sent to the user equipment (UE) 204 only from the high-speed serving cell, i.e., high-speed data 212 may be transmitted to the user equipment (UE) 204 from cell 206a on the HS-DSCH.

At some point, the user equipment (UE) 204 may determine that cell2 206b has deteriorated significantly for a long time relative to the other cells in the active set and needs to be removed from the active set. Therefore, the user equipment (UE) 204 may send an event 1B 222, i.e., the event 1B 222 may indicate a request to remove cell2 from the active set of the user equipment (UE) 204. Alternatively, the user equipment (UE) 204 may send an event 1A to add a cell to the active set or an event 1C to replace a cell in the active set. Alternatively, the user equipment (UE) 204 may send some combination of event 1A, event 1B 222 and event 1C to change the active set of the user equipment (UE) 204. For example, the events may be reporting events as described in Section 14.1 of 3GPP TS 25.331 V10.1.0.

Near the same time, there may be changes in the radio frequency (RF) conditions and the user equipment (UE) 204 may determine that cell3 208, is better than the source cell, cell 206a. In response, the user equipment (UE) 204 may send an event 1D 224 to the radio network controller (RNC) 202.

Such changes in the RF conditions may occur commonly in certain environments, e.g., in an urban-canyon environment. The radio network controller (RNC) 202 may receive the event1B 222 followed by the event1D 224 in quick succession.

In response to the event 1B, the radio network controller (RNC) 202 may send an ActiveSetUpdate (ASU) message 226 to remove cell2 206b from the current active set. At this point, the user equipment (UE) 204 may have already started monitoring the Secondary-SCCH on the target cell 208 for which it had sent an event 1D 224. This is the first step on the user equipment (UE) 204 side as part of the E-SCC procedure. However, the radio network controller (RNC) 202 may not instruct the target node B cell3 208 to send out SCCH-orders because it is waiting for the ActiveSetUpdateComplete message so that the ActiveSetUpdate procedure is complete. This indication from the radio network controller (RNC) 202 to a target node B 208 to send the SCCH-orders in response to the event 1D 224 would be the first step on the radio network controller (RNC) 202 side as part of the ESCC procedure.

On the other hand, the ActiveSetUpdate message 226 is sent only on the source cell 206a, which is the high-speed serving cell at this point. But, due to the changes in RF conditions, the source cell 206a may deteriorate rapidly and there may not be enough time to complete the transfer of this signaling message to the user equipment (UE) 204 even with multiple retransmissions at Layer 1 and Layer 2 because all the data is sent only from the serving cell 206a. So, in this case the ActiveSetUpdate message 226 may not reach the user equipment (UE) 204 at all. Also, the target cell 208 has not started the ESCC process because it has not received the indication 228 from the radio network controller (RNC) 202 to send the SCCH orders because the user equipment's (UE's) 204 request to do so (i.e., the event 1D 224) is queued up behind the active set update procedure (i.e., the event 1B 222).

This may lead to a situation where the user equipment (UE) 204 is waiting for the SCCH orders from the target cell3 208 to start the ESCC procedure and the radio network controller (RNC) 202 is waiting on the completion of the active set update procedure so that it can start the ESCC procedure. This may result in a dropped call. A similar problem may occur for any reconfiguration signaling message when the high-speed serving cell 206a deteriorates quickly leading to the user equipment (UE) 204 not receiving a message and the radio network controller (RNC) 202 waiting on event handling to complete.

Figure 3:
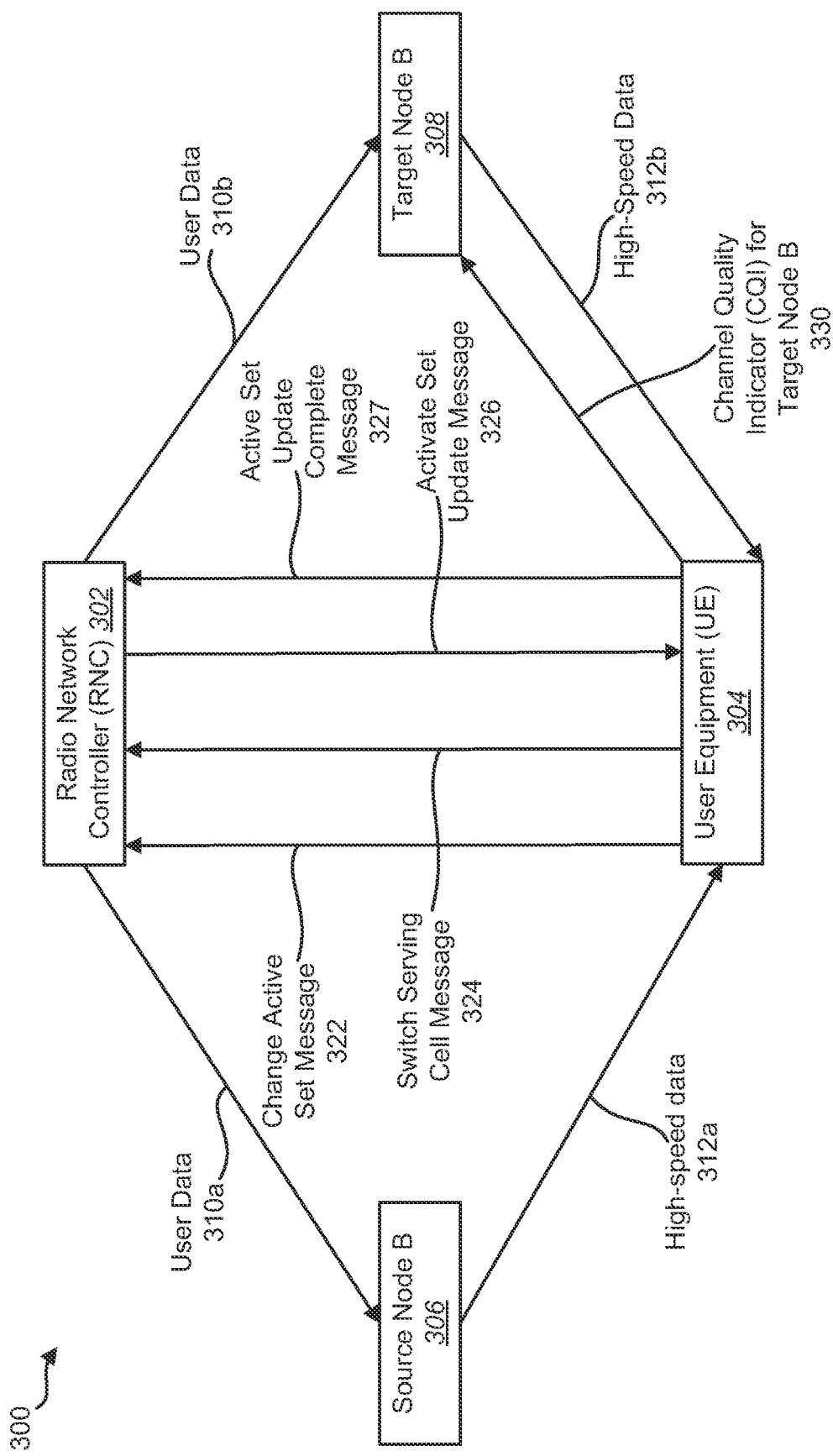
FIG. 3 is a block diagram illustrating a wireless communication system for minimizing call drops during a serving cell change, e.g., an Enhanced Serving Cell Change (ESCC) procedure.

FIG. 3 is a block diagram illustrating a wireless communication system 300 for minimizing call drops during a serving cell change, e.g., an Enhanced Serving Cell Change (ESCC) procedure. The system 300 may include a radio network controller (RNC) 302, one or more user equipments (UEs) 304, a source node B 306 and a target node B 308. The node Bs 306, 308 may have multiple cells or a single cell. While a source node B 306 and a target node B 308 are illustrated, the present systems and methods apply equally to a source cell in a source node B 306 and a target cell in a target node B 308.

User data 310a may be sent to the source node B 306. Signaling Radio Bearers (SRBs) may be mapped on to the High-Speed Downlink Shared Channel (HS-DSCH). So, all the dedicated control messaging from Layer 3 and the non-access stratum (NAS), as well as user data 310, may be sent to the user equipment only from the high-speed serving cell, i.e., high-speed data 312a may be transmitted to the user equipment (UE) 304 from the source node B 306 on the HS-DSCH. As discussed previously, when SRBs are mapped to the shared channel (e.g., in HSDPA), exchanging Layer 3 signaling messages in a situation where the current serving cell is deteriorating rapidly may result in a situation where the radio link to the user equipment (UE) 304 cannot be sustained long enough to complete the control message exchange.

Under this condition, if a switch serving cell message 324 (e.g., event 1D) follows shortly after a change active set message 322 (e.g., event 1A, 1B or 1C), then the Layer 3 messaging exchange (e.g., the ASU 326 and ASUC 327) may need to complete before the ESCC will be attempted. In other words, the radio network controller (RNC) 302 may traditionally not process the switch serving message 324 until it receives an ActiveSetUpdateComplete message 327.

However, due to the standardization of the ESCC procedure, which allows this mechanism to be performed at Layer 1, it is possible to perform this procedure in parallel with other Layer 3 reconfiguration procedures, i.e., the radio network controller (RNC) 302 may be able to process the switch serving cell message 324 before the ActiveSetUpdateComplete message 327 is received. In one configuration, the change active set message 322 may be parallel processed with the switch serving cell message 324, i.e., the switch serving cell message 324 may be at least partially processed by the radio network controller (RNC) 302 before the processing of the change active set message 322 is complete.

This may be particularly beneficial to the operation of ESCC in harsh communication environments, e.g., an urban canyon scenario. In such a dynamic radio environment, mobility-related events (e.g., events 1A/1B/1C 322 and event 1D 324) may arrive in close proximity to each other. Therefore, without the ability to process the switch serving cell message 324 before completely processing the change active set message 322, some implementations of the system 300 may result in a cell update and a call drop.

Therefore, the present systems and methods may allow the ESCC (i.e., the switch serving cell message 324) to be processed in parallel with the other measurement report messages to change the active set (i.e., the change active set message 322). One purpose of this is to switch to the best cell sooner to reduce the probability of call drops. This may enable the target node B 308 to become the source node B 306, receive user data 310b from the radio network controller (RNC) 302 and send high-speed data 312b to the user equipment (UE) 304. Furthermore, after the ESCC procedure that is initiated by the switch serving cell message 324 is complete, the user equipment (UE) 304 may switch to monitoring and sending a channel quality indicator (CQI) for the target node B 330 because the target node B 308 has become the source node B 306.

Figure 4:
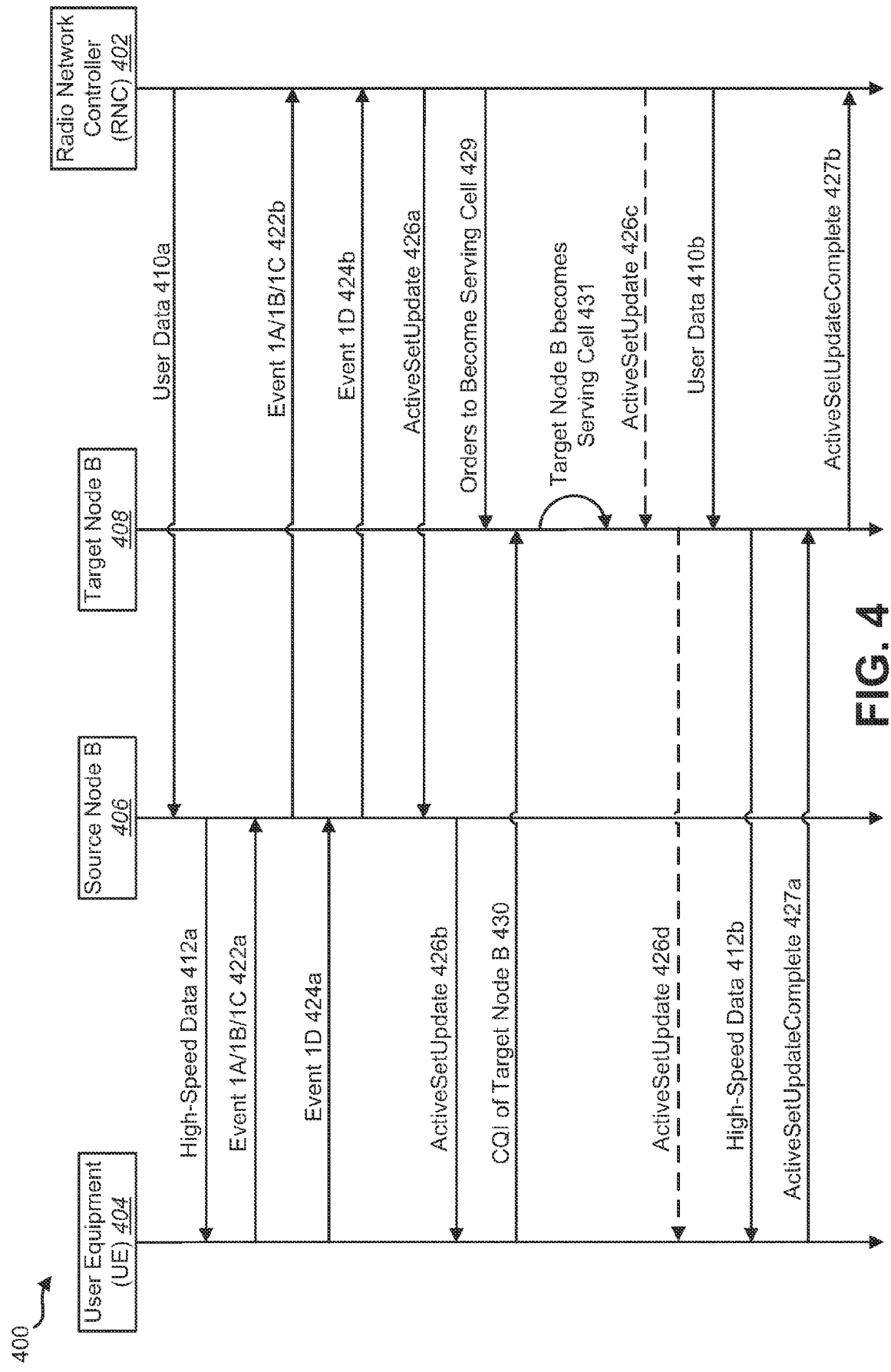
FIG. 4 is a sequence diagram illustrating a method for minimizing call drops during a serving cell change, e.g., an Enhanced Serving Cell Change (ESCC) procedure.

FIG. 4 is a sequence diagram illustrating a method 400 for minimizing call drops during a serving cell change, e.g., an Enhanced Serving Cell Change (ESCC) procedure. The method 400 may include signaling between a user equipment (UE) 404, a source node B 406, a target node B 408 and a radio network controller (RNC) 402. Furthermore, the signaling to or from the radio network controller (RNC) 402 may alternatively or additionally involve other network devices, e.g., core network devices. While a source node B 406 and a target node B 408 are illustrated, the present systems and methods apply equally to a source cell in a source node B 406 and a target cell in a target node B 408.

The radio network controller (RNC) 402 may send user data 410a to the source node B 406, which may be included as a portion of the high-speed data 412a sent from the source node B 406 to the user equipment (UE) 404. In other words, the source node B 406 may include the serving cell. Based on signal quality measurements, the user equipment (UE) 404 may send an event 1A, 1B or 1C 422*a-b* to the radio network controller (RNC) 402 to request a cell be added, removed or replaced in the active set, respectively. The user equipment (UE) 404 may also send an event 1D 424*a-b* to the radio network controller (RNC) 402 to request a serving cell change. Since the user equipment (UE) 404 may be in soft handoff, these uplink messages may be received by all node Bs 406, 408 in the active set. This may be the first step of an ESCC procedure. In response to the event 1A, 1B or 1C 422*a-b*, the radio network controller (RNC) 402 may send an ActiveSetUpdate 426*a-b* to the user equipment (UE) 404 via the source node B 406 if the signaling radio bearers (SRBs) are mapped to a high-speed channel. For example, if an event 1A 422*a-b* was received, the ActiveSetUpdate 426*a-b* may instruct the user equipment (UE) 404 to add the requested cell to the active set. If an event 1B 422*a-b* was received, the ActiveSetUpdate 426*a-b* may instruct the user equipment (UE) 404 to remove the requested cell to the active set. If an event 1C 422*a-b* was received, the ActiveSetUpdate 426*a-b* may instruct the user equipment (UE) 404 to replace the requested cell with the indicated new cell in the active set.

At this point, instead of waiting for an ActiveSetUpdateComplete 422*a-b*, the radio network controller (RNC) 402 may continue the ESCC procedure by sending orders to become the serving cell 429 to the target node B 408. By this point, the user equipment (UE) 404 may have begun listening to the Secondary SCCH on the target node B 408 for which it sent the event 1D 424*a-b*. Furthermore, the user equipment (UE) 404 may begin sending channel quality indicators (CQIs) of the target node B 430 to the target node B 408.

The target node B 408 may reconfigure 431 itself to become the serving cell. This reconfiguration may be based on the orders to become the serving cell 429 from the radio network controller (RNC) 402, e.g., frequency reassignment, etc. Specifically, the target node B 408 may establish a high-speed channel with the user equipment (UE) 404. Thereafter, the target node B 408 may receive user data 410*b* from the radio network controller (RNC) 402 and send high-speed data 412*b* to the user equipment (UE) 404. The user equipment (UE) 404 may respond with an ActiveSetUpdateComplete 427*a-b* message to the radio network controller (RNC) 402 via the target node B 408.

The present systems and methods may effect a serving cell change sooner than traditional methods, i.e., faster than ESCC without parallel processing. Another advantage is that if the ActiveSetUpdate message 426*a-b* did not go through on the source cell 406 due to quick deterioration, the retransmission of the ActiveSetUpdate message 426*c-d* may be sent from the target cell 408 after the serving cell change completes and may have better chance of reaching user equipment (UE) 404. In other words, the radio network controller (RNC) 402 may re-send the active set update message 426*c-d* to the user equipment (UE) 404 (e.g., if no layer 2 acknowledgment, such as an ActiveSetUpdateComplete message 427*a-b*, is received within a threshold time) via the target cell 408 after the target cell 408 becomes the serving cell 406. As a result, the likelihood of dropped calls may be greatly reduced.

Figure 5:
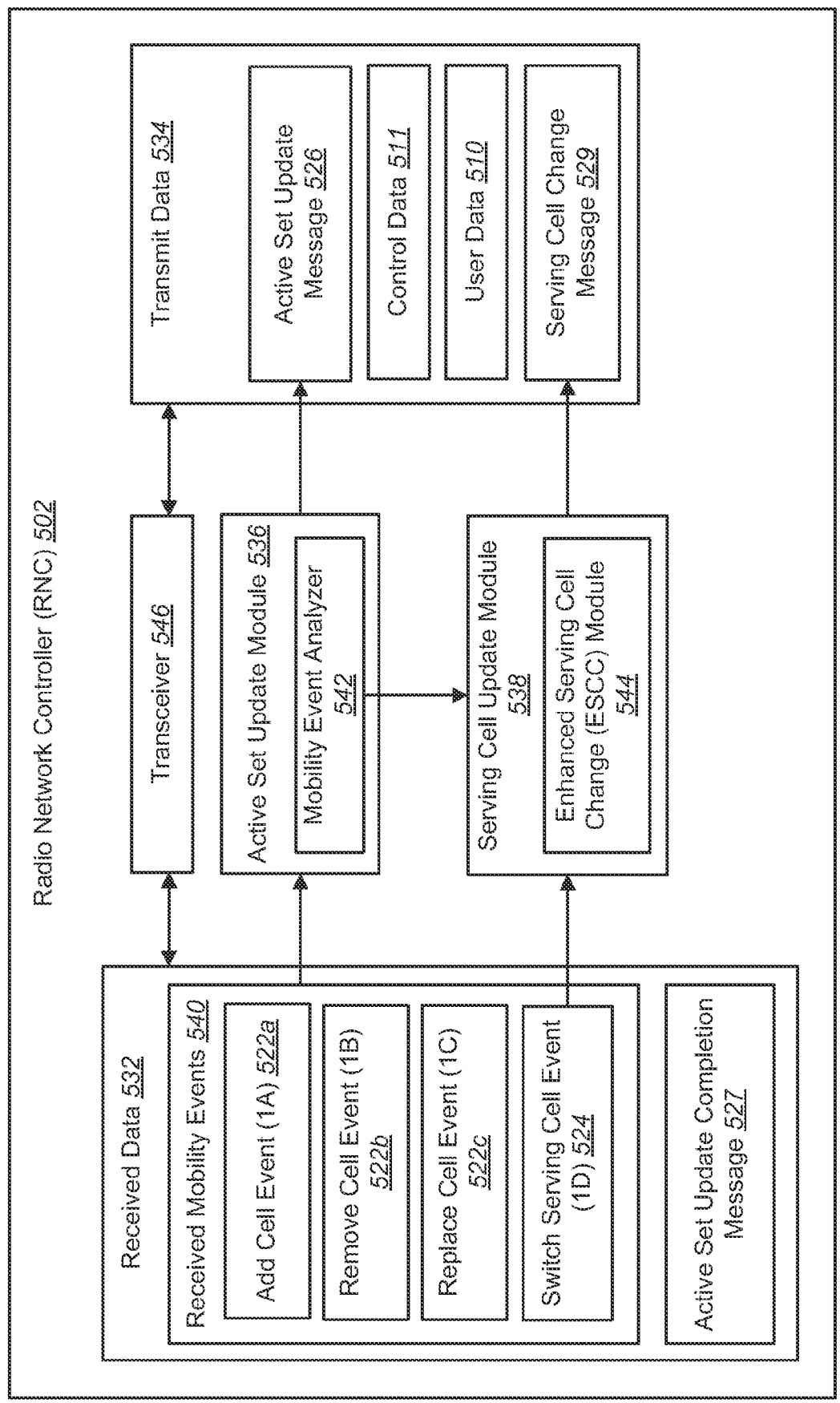
FIG. 5 is a block diagram of a radio network controller for minimizing call drops during a serving cell change, e.g., an Enhanced Serving Cell Change (ESCC) procedure.

FIG. 5 is a block diagram of a radio network controller (RNC) 502 for minimizing call drops during a serving cell change, e.g., an Enhanced Serving Cell Change (ESCC) procedure. The radio network controller (RNC) 502 may use received data 532 to determine transmit data 534. Specifically, an active set update module 536 may determine an active set update message 526 and a serving cell update module 538 may determine a serving cell change message 529.

As discussed above, calls may be dropped during a serving cell change (e.g., ESCC) due to a rapidly deteriorating link with a serving cell. In this case, a user equipment (UE) 404 may not be able to receive and/or process an active set update message 526 from the radio network controller (RNC) 502 because the old serving cell link is deteriorating. Furthermore, the radio network controller (RNC) 502 may be waiting for an active set update completion message 527 before it continues the serving cell procedure.

Therefore, to minimize dropped calls, the radio network controller (RNC) 502 may completely or partially process a switch serving cell event 524 before a previously received mobility event is completely processed. For example, the radio network controller (RNC) 502 may send the serving cell change message 529 before receiving the active set update completion message 527.

One or more mobility events 540 may be received in quick succession. Examples of these mobility events 540 include an add cell event 522*a*, a remove cell event 522*b*, a replace cell event 522*c*, and a switch serving cell event 524. If a mobility event 540 that requests a change to the active set (i.e., event 1A/1B/1C 522*a-c*) is received shortly before a switch serving cell event 524, the active set update module 536 may determine an active set update message 526 for the user equipment (UE) 404 and the mobility event analyzer 542 may determine whether to initiate the serving cell update module 538. This may depend on whether a switch serving cell event 524 was received shortly after an event 1A/1B/1C 522*a-c*, i.e., the switch serving cell event 524 may need to be processed before the event 1A/1B/1C 522*a-c* is completely processed. In other words, the serving cell update module 538 may use an Enhanced Serving Cell Change (ESCC) module 544 to produce a serving cell change message 529 before the radio network controller (RNC) 502 receives the active set update completion message 527. This may be referred to as parallel processing, i.e., partially or completely processing the switch serving cell event 524 before completely processing the event 1A/1B/1C 522*a-c*. Alternatively, if a switch serving cell event 524 is not received shortly after an event 1A/1B/1C 522*a-c*, the mobility event analyzer 542 not activate the serving cell update module 538.

Once the serving cell change message 529 (i.e., orders to become the serving cell) is sent to a target node B, the target node B may reconfigure itself to become the serving node B. Thereafter, the radio network controller (RNC) 502 may send user data 510 and control data 511 to the user equipment (UE) 404 via the target node B, which is now the source node B, via a transceiver 546.

Figure 6:
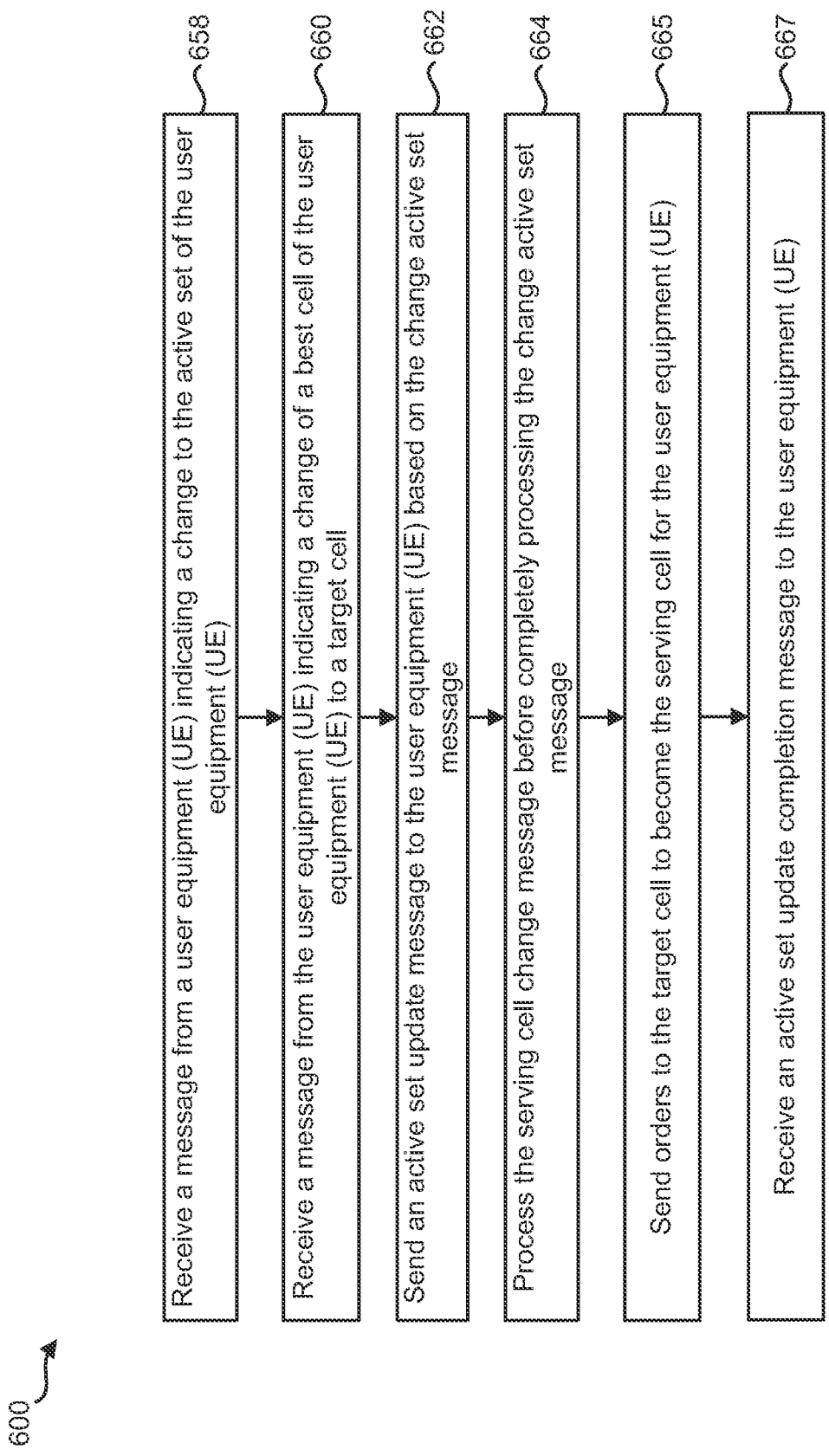
FIG. 6 is a flow diagram illustrating a method for minimizing call drops during a serving cell change, e.g., an Enhanced Serving Cell Change (ESCC) procedure.

FIG. 6 is a flow diagram illustrating a method 600 for minimizing call drops during a serving cell change, e.g., an Enhanced Serving Cell Change (ESCC) procedure. The method 600 may be performed by a radio network controller (RNC) 402. While the method 600 is described in terms of serving cells and target cells, the method 600 may instead use serving node Bs and target node Bs. The radio network controller (RNC) 402 may receive 658 a message 422*a-b* from a user equipment (UE) 404 requesting a change to the active set of the user equipment (UE) 404. For example, this may be an event 1A 422*a* to add a cell, an event 1B 422*b* to remove a cell or an event 1C 422*c* to replace a cell with another cell. The radio network controller (RNC) 402 may also receive 660 a message 424*a-b* from the user equipment (UE) 404 indicating a change of a best cell and requesting a change of a serving cell of the user equipment (UE) 404 to a target cell to a target cell, e.g., an event 1D 424*a-b*. In other words, the user equipment (UE) 404 may send events 422*a-b*, 424*a-b* (i.e., measurement reporting of the cells) to inform the radio network controller (RNC) 402 of the measurements. The user equipment (UE) 404 may then wait for a command (e.g., ActiveSetUpdate 426*a-b*, PhysicalChannelReconfiguration, etc.) from the radio network controller (RNC) 402 before actually making changes to the active set.

The radio network controller (RNC) 402 may also send 662 an active set update message 426*a-b* to the user equipment (UE) 404 based on the change active set message, e.g., an ActiveSetUpdate 426*a-b* may be sent in response to the event 1A/1B/1C 422*a-b*. The radio network controller (RNC) 402 may also process 664 the serving cell change message before completely processing the change active set message. Therefore, instead of waiting for an indication (e.g., ActiveSetUpdateComplete 427*a-b*) from the user equipment (UE) 404 that the active set update is complete, the radio network controller (RNC) 402 may begin the serving cell change procedure (e.g., ESCC) based on the serving cell change message 424*a-b*. This may be a type of parallel processing in the radio network controller (RNC) 402, i.e., partially or completely processing the serving cell change message 424*a-b* before completely processing the change active set message 422*a-b*. As part of this serving cell change procedure, the radio network controller (RNC) 402 may also send 665 orders 429 to the target cell to become the serving cell for the user equipment (UE) 404. After the user equipment (UE) 404 changes the active set, the radio network controller (RNC) 402 may receive 667 an active set update completion message 427*a-b* from the user equipment (UE) 404. The messages and events used in the method 600 may be measurement report messages (MRMs).

Figure 7:
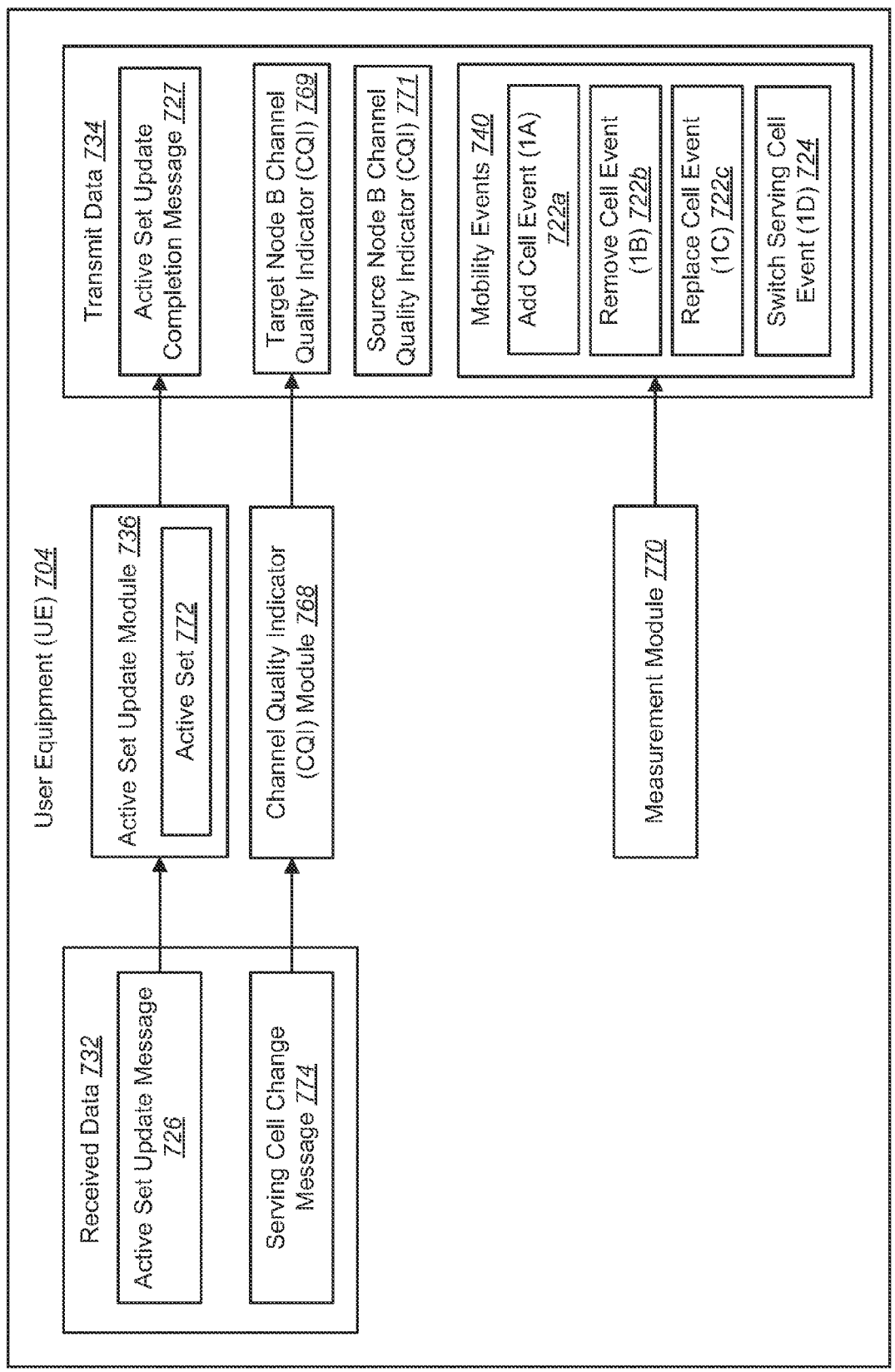
FIG. 7 is a block diagram illustrating a user equipment for minimizing call drops during a serving cell change, e.g., an Enhanced Serving Cell Change (ESCC) procedure.

FIG. 7 is a block diagram illustrating a user equipment (UE) 704 for minimizing call drops during a serving cell change, e.g., an Enhanced Serving Cell Change (ESCC) procedure. The user equipment (UE) 704 may use received data 732 to determine transmit data 734. Specifically, an active set update module 736 may determine an active set update completion message 727 and a channel quality indicator (CQI) module 768 may determine a target node B channel quality indicator 769.

During the course of operation, the user equipment (UE) 704 may use a measurement module 770 to initiate mobility events 740. Examples of these mobility events 740 include an add cell event 722*a*, a remove cell event 722*b*, a replace cell event 722*c*, and a switch serving cell event 724. The events may be generated based on user equipment (UE) 704 monitoring of the primary common pilot channel (CPICH). Specifically, the Ec/No (i.e., the ratio of energy per chip to total noise and interference) or the received signal code power (RSCP) of the CPICH. For example, if the signal-to-noise ratio (SNR) of a particular cell not in the active set 772 of the user equipment (UE) 704 exceeds a predetermined threshold, the measurement module 770 may generate an add cell event (1A) 722*a*. If the signal-to-noise ratio (SNR) of a cell in the active set 772 falls below a predetermined threshold, the measurement module 770 may generate a remove cell event (1B) 722*b*. If the signal-to-noise ratio (SNR) of a particular cell not in the active set 772 exceeds the signal-to-noise ratio (SNR) of a cell in the active set 772, the measurement module 770 may generate a replace cell event (1C) 722*c*. Additionally, a switch serving cell event (1D) 724 may be generated based on a change of the best cell in the active set.

After sending one or more mobility event 740 requesting a change to the active set 772 (e.g., event 1A/1B/1C 722*a-c*), the user equipment (UE) 704 may receive an active set update message 726. Based on the active set update message 726, the active set update module 736 may update the active set 772 (i.e., add, remove or replace a cell in the active set 772) and produce an active set update completion message 727 to send to a radio network controller (RNC) 502.

In response to a switch serving cell event (1D) 724, the user equipment (UE) 704 may receive a serving cell change message 774 from a target node B, e.g., the target node B may send HS-SCCH order to the user equipment (UE) 704. From this message 774, the channel quality indicator (CQI) module 768 may determine a target node B channel quality indicator (CQI) 769 and send it to the target node B. In other words, the user equipment (UE) 704 may determine source cell channel quality indicators (CQIs) 771 before the target cell becomes the source cell and may determine target cell CQIs 769 after the target cell becomes the source cell. Thereafter, the user equipment (UE) 704 may receive user data and control data from the radio network controller (RNC) 502 via the target node B, which is now the source node B.

Figure 8:
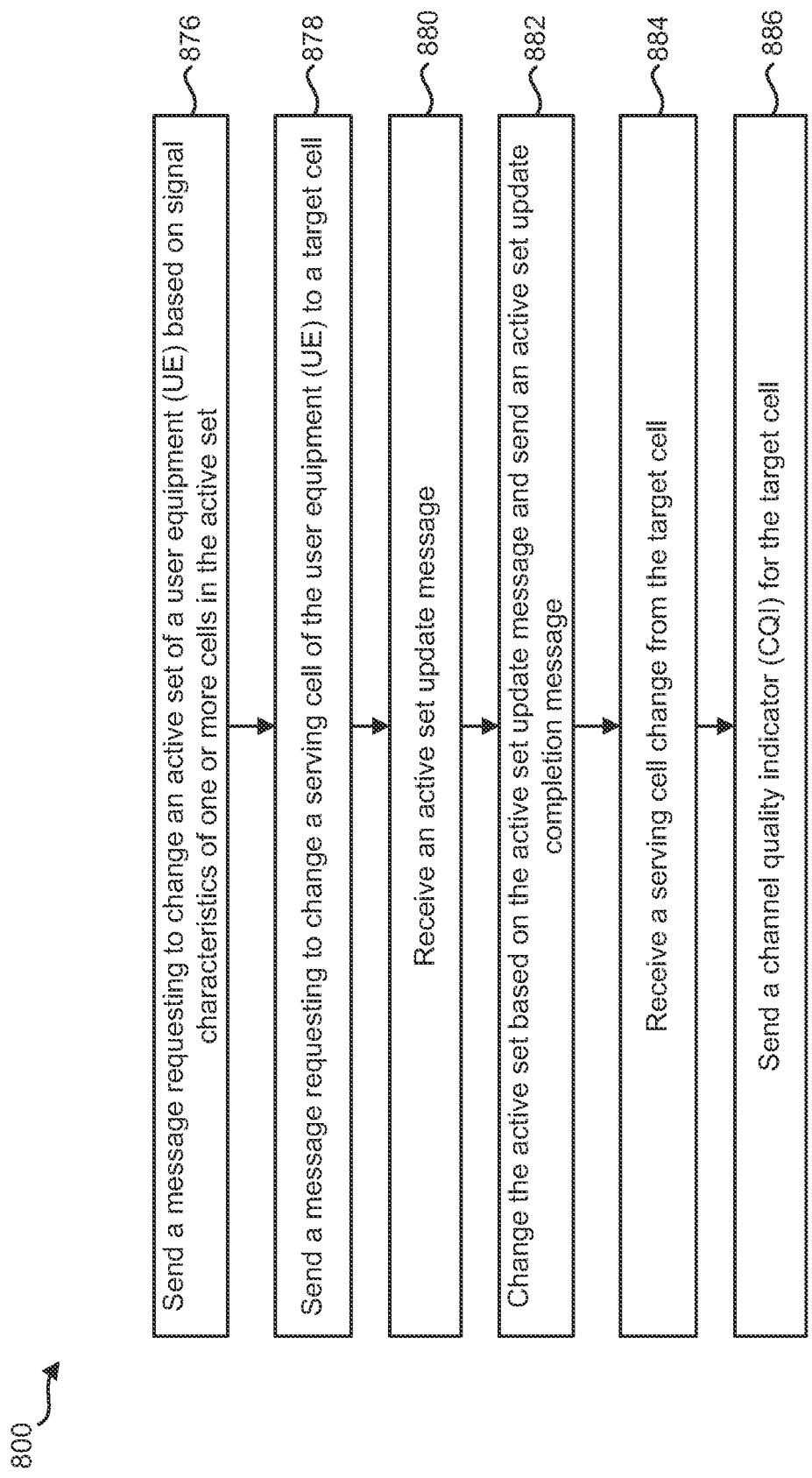
FIG. 8 is a flow diagram illustrating a method for minimizing call drops during a serving cell change, e.g., an Enhanced Serving Cell Change (ESCC) procedure.

FIG. 8 is a flow diagram illustrating a method 800 for minimizing call drops during a serving cell change, e.g., an Enhanced Serving Cell Change (ESCC) procedure. The method 800 may be performed by a user equipment (UE) 704. The user equipment (UE) 704 may send 876 a message (e.g., event 1A/1B/1C 722*a-c*) requesting to change an active set 772 of the user equipment (UE) 704 based on signal characteristics of one or more cells in the active set 772. The user equipment (UE) 704 may also send 878 a message (e.g., event 1D 724) requesting to change a serving cell of the user equipment (UE) 704 to a target cell. The user equipment (UE) 704 may also receive 880 an active set update message 726. The user equipment (UE) 704 may also change 882 the active set 772 based on the active set update message 726 and send an active set update completion message 727. The user equipment (UE) 704 may also receive 884 a serving cell change message 774 from the target cell indicating that the target cell is the new serving cell. The user equipment (UE) 704 may also send 886 a channel quality indicator (CQI) for the target cell 769.

Figure 9:
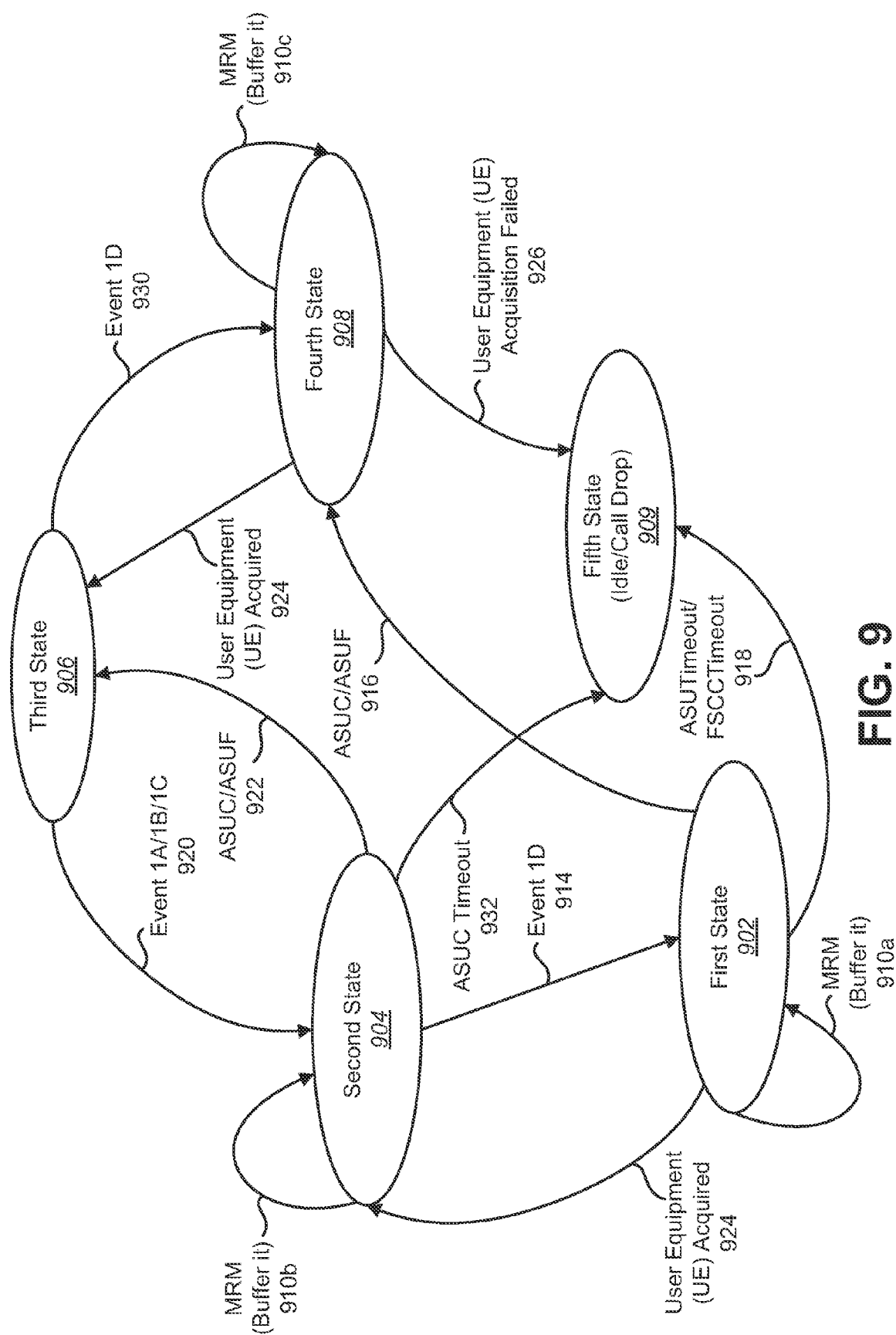
FIG. 9 is a state diagram illustrating possible states in a system for minimizing call drops during a serving cell change, e.g., an Enhanced Serving Cell Change (ESCC) procedure.

FIG. 9 is a state diagram illustrating possible states in a system for minimizing call drops during a serving cell change, e.g., an Enhanced Serving Cell Change (ESCC) procedure. The system may include four states: (1) ActiveSetUpdate pending, fast serving cell change (FSCC) pending and ratio access bearer (RAB) established 902; (2) ActiveSetUpdate pending and radio access bearer (RAB) established 904; (3) radio access bearer established 906; (4) fast serving cell change pending and radio access bearer established 908; and (5) idle/call drop 909. The states may represent the possible modes of operation in a radio network controller (RNC) 502. Furthermore, a measurement report message (MRM) 910*a-c* may be generated and buffered in the first state 902, second state 904 or the fourth state 908.

In the first state 902, the active set update procedure and serving cell change procedure may both be pending. If the ActiveSetUpdate or fast serving cell change times out 918, the system may transition to the idle/call drop state 909. If the user equipment is acquired 924, the system may transition to the second state 904. If an ActiveSetUpdateComplete is received 916, the system may transition to the fourth state 908.

In the second state 904, if an event 1D is received 914, the system may start the ESCC procedure then transition back to the first state 902. If the system times out 932 while waiting for an ActiveSetUpdateComplete 922, the system may transition to the idle/call drop state 909. If an ActiveSetUpdateComplete 922 is received, the system may transition to the third state 906.

In the third state 906, if an event 1A/1B/1C is received 920, the system may start the active set update procedure and then transition to the second state 904. However, if an event 1D is received 930, the system may transition to the fourth state 908.

In the fourth state 908, if the user equipment (UE) 704 is acquired 924 (i.e., the ESCC procedure is completed), the system may transition to the third state 906. However, if user equipment (UE) 704 acquisition fails 926, the system may transition to the idle/call drop state 909.

Figure 10:
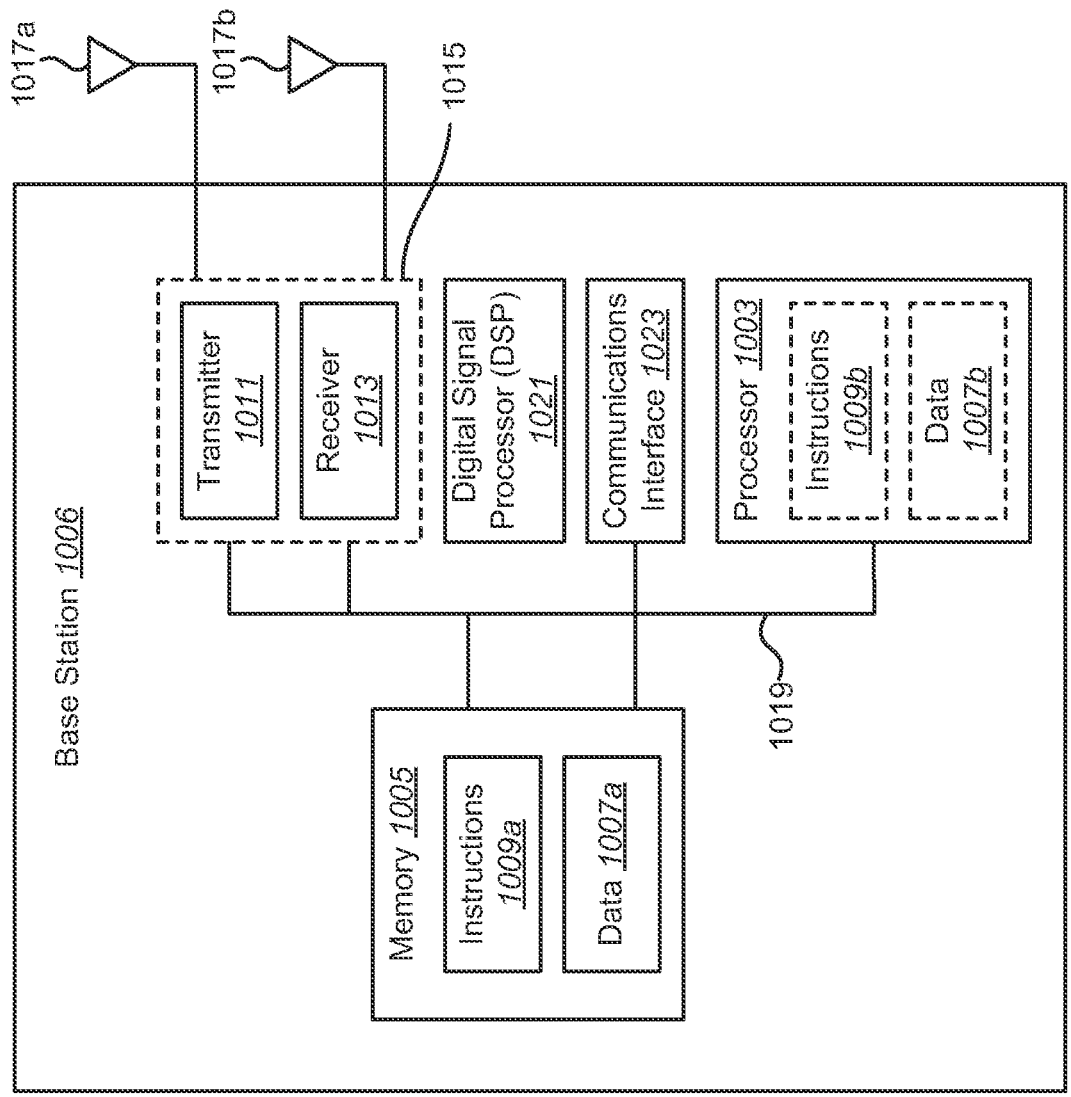
FIG. 10 illustrates certain components that may be included within a base station.

FIG. 10 illustrates certain components that may be included within a base station 1006. A base station 1006 may also be referred to as, and may include some or all of the functionality of an access point, a broadcast transmitter, a node B, an evolved node B, etc. The base station 1006 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the base station 1006 of FIG. 10, in an alternative configuration, a combination of processors (e.g., an ARM and DSP) could be used.

The base station 1006 also includes memory 1005. The memory 1005 may be any electronic component capable of storing electronic information. The memory 1005 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1007a and instructions 1009a may be stored in the memory 1005. The instructions 1009a may be executable by the processor 1003 to implement the methods disclosed herein. Executing the instructions 1009a may involve the use of the data 1007a that is stored in the memory 1005. When the processor 1003 executes the instructions 1009a, various portions of the instructions 1009b may be loaded onto the processor 1003, and various pieces of data 1007b may be loaded onto the processor 1003.

The base station 1006 may also include a transmitter 1011 and a receiver 1013 to allow transmission and reception of signals to and from the base station 1006. The transmitter 1011 and receiver 1013 may be collectively referred to as a transceiver 1015. Multiple antennas 1017a-b may be electrically coupled to the transceiver 1015. The base station 1006 may also include (not shown) multiple transmitters, multiple receivers, multiple transceivers and/or additional antennas.

The base station 1006 may include a digital signal processor (DSP) 1021. The base station 1006 may also include a communications interface 1023. The communications interface 1023 may allow a user to interact with the base station 1006.

The various components of the base station 1006 may be coupled together by one or more buses, which may include a power bus, a control signal bus, a status signal bus, a data bus, etc. For the sake of clarity, the various buses are illustrated in FIG. 10 as a bus system 1019.

Figure 11:
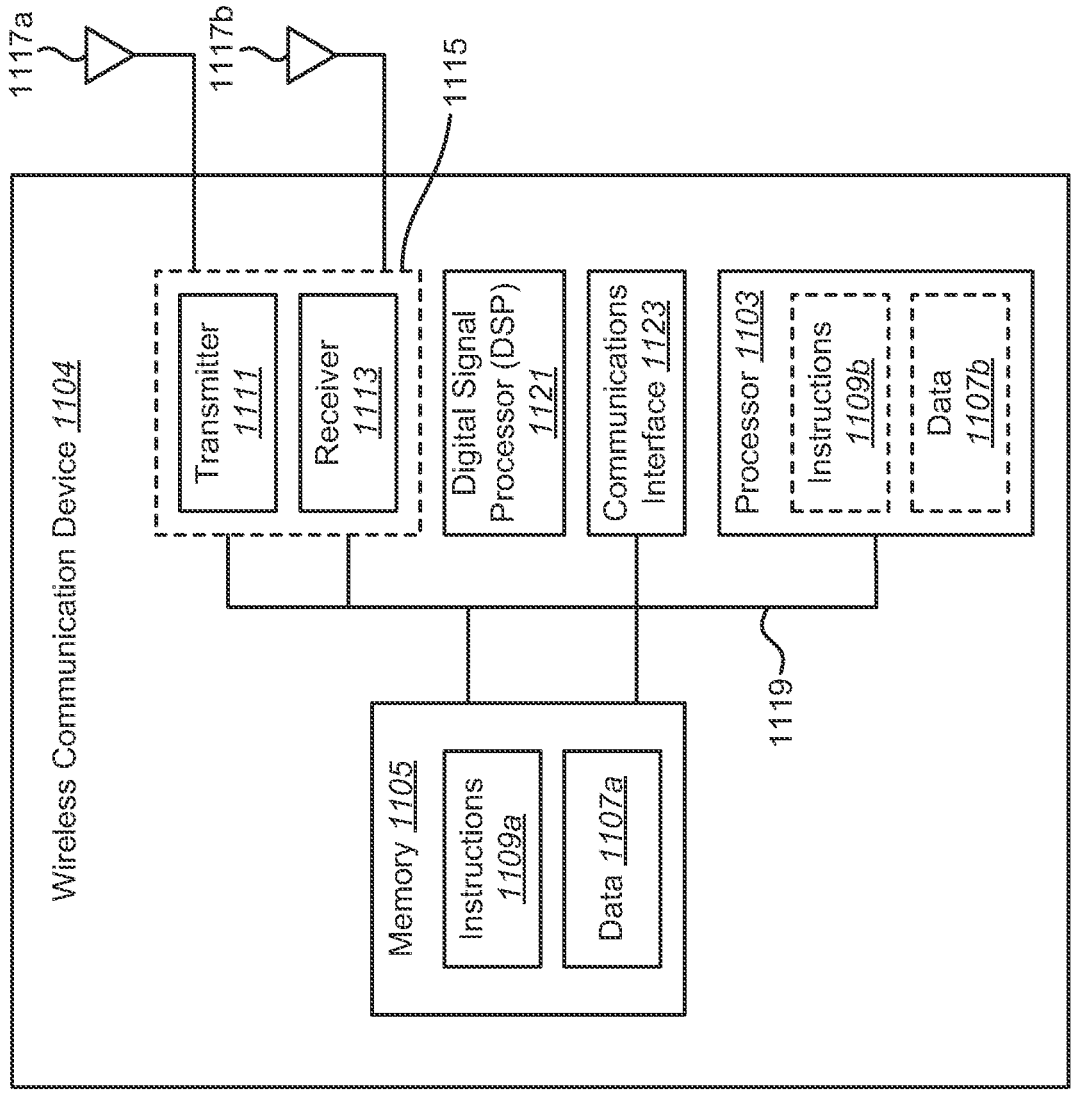
FIG. 11 illustrates certain components that may be included within a wireless communication device.

FIG. 11 illustrates certain components that may be included within a wireless communication device 1104. The wireless communication device 1104 may be an access terminal, a mobile station, a user equipment (UE), etc. The wireless communication device 1104 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the wireless communication device 1104 of FIG. 11, in an alternative configuration, a combination of processors (e.g., an ARM and DSP) could be used.

The wireless communication device 1104 also includes memory 1105. The memory 1105 may be any electronic component capable of storing electronic information. The memory 1105 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1107a and instructions 1109a may be stored in the memory 1105. The instructions 1109a may be executable by the processor 1103 to implement the methods disclosed herein. Executing the instructions 1109a may involve the use of the data 1107a that is stored in the memory 1105. When the processor 1103 executes the instructions 1109a, various portions of the instructions 1109b may be loaded onto the processor 1103, and various pieces of data 1107b may be loaded onto the processor 1103.

The wireless communication device 1104 may also include a transmitter 1111 and a receiver 1113 to allow transmission and reception of signals to and from the wireless communication device 1104. The transmitter 1111 and receiver 1113 may be collectively referred to as a transceiver 1115. Multiple antennas 1117a-b may be electrically coupled to the transceiver 1115. The wireless communication device 1104 may also include (not shown) multiple transmitters, multiple receivers, multiple transceivers and/or additional antennas.

The wireless communication device 1104 may include a digital signal processor (DSP) 1121. The wireless communication device 1104 may also include a communications interface 1123. The communications interface 1123 may allow a user to interact with the wireless communication device 1104.

The various components of the wireless communication device 1104 may be coupled together by one or more buses, which may include a power bus, a control signal bus, a status signal bus, a data bus, etc. For the sake of clarity, the various buses are illustrated in FIG. 11 as a bus system 1119.

Figure 12:
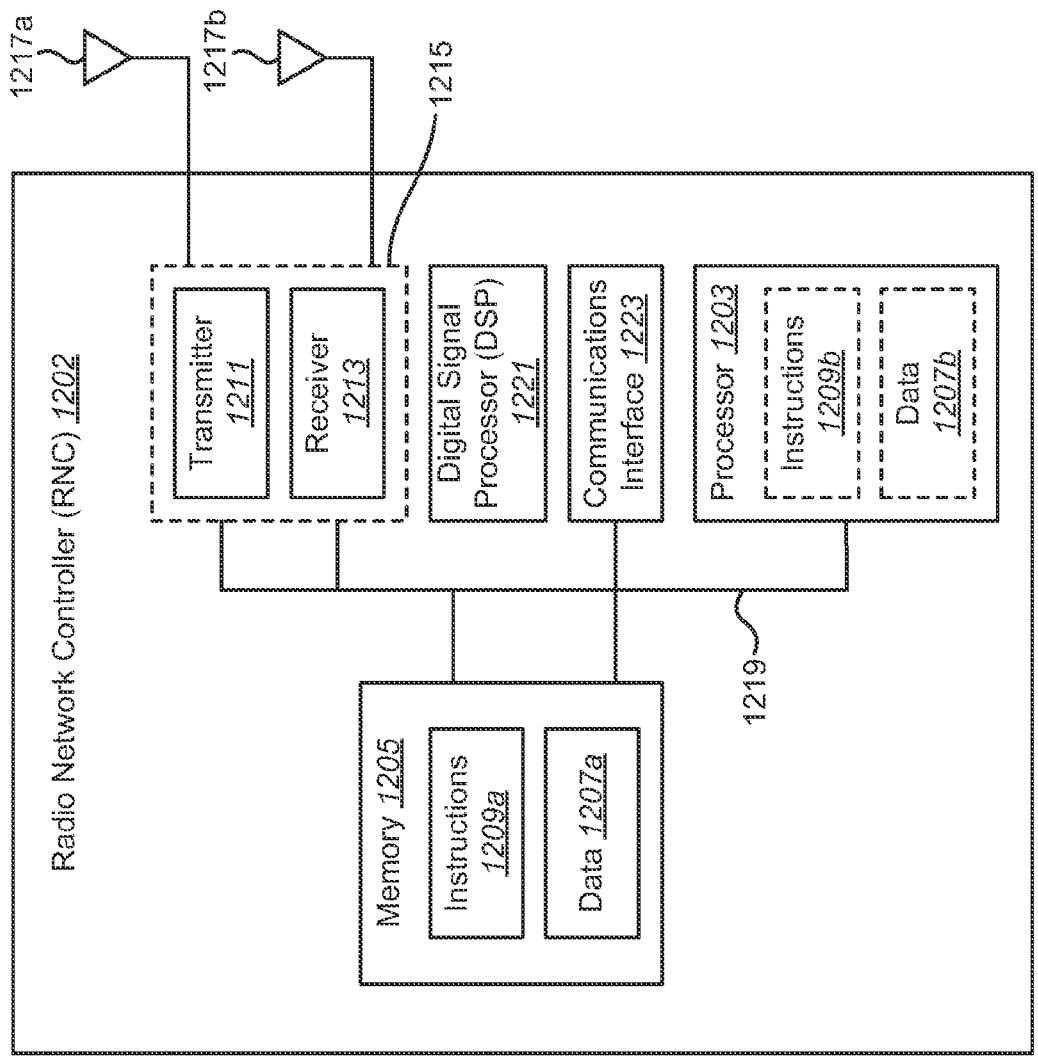
FIG. 12 illustrates certain components that may be included within a radio network controller.

FIG. 12 illustrates certain components that may be included within a radio network controller (RNC) 1202. A radio network controller (RNC) 1202 is a governing element in the UMTS radio access network (UTRAN) that is responsible for controlling the base stations 1006 (or node Bs 1102) that are connected to it. The radio network controller (RNC) 1202 may be connected to a circuit switched core network through a media gateway. The radio network controller (RNC) 1202 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the radio network controller (RNC) 1202 of FIG. 12, in an alternative configuration, a combination of processors (e.g., an ARM and DSP) could be used.

The radio network controller (RNC) 1202 also includes memory 1205. The memory 1205 may be any electronic component capable of storing electronic information. The memory 1205 may be embodied as random access memory (RAM), read only memory (ROM), magnetic disk storage media, optical storage media, flash memory devices in RAM, on-board memory included with the processor, EPROM memory, EEPROM memory, registers and so forth, including combinations thereof.

Data 1207a and instructions 1209a may be stored in the memory 1205. The instructions 1209a may be executable by the processor 1203 to implement the methods disclosed herein. Executing the instructions 1209a may involve the use of the data 1207a that is stored in the memory 1205. When the processor 1203 executes the instructions 1209a, various portions of the instructions 1209b may be loaded onto the processor 1203, and various pieces of data 1207b may be loaded onto the processor 1203.

The radio network controller (RNC) 1202 may also include a transmitter 1211 and a receiver 1213 to allow transmission and reception of signals to and from the radio network controller (RNC) 1202. The transmitter 1211 and receiver 1213 may be collectively referred to as a transceiver 1215. Multiple antennas 1217a-b may be electrically coupled to the transceiver 1215. The radio network controller (RNC) 1202 may also include (not shown) multiple transmitters, multiple receivers, multiple transceivers and/or additional antennas.

The radio network controller (RNC) 1202 may include a digital signal processor (DSP) 1221. The radio network controller (RNC) 1202 may also include a communications interface 1223. The communications interface 1223 may allow a user to interact with the radio network controller (RNC) 1202.

The various components of the radio network controller (RNC) 1202 may be coupled together by one or more buses, which may include a power bus, a control signal bus, a status signal bus, a data bus, etc. For the sake of clarity, the various buses are illustrated in FIG. 12 as a bus system 1219.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 6 and 8, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for minimizing call drops during a serving cell change, comprising:
    receiving a first measurement report message from a user equipment (UE) requesting a change to an active set of the UE;
    receiving a second measurement report message from the UE, wherein the second measurement report message includes indicating a change of a best cell and requesting a change of a serving cell to a target cell; and
    processing the second measurement report message before completely processing the first measurement report message in response to receiving the second measurement report message to allow the UE to receive user data or control data through the target cell.

2. The method of claim 1, further comprising sending an active set update message to the user equipment (UE) based on the first measurement report message.

3. The method of claim 2, wherein the processing the second measurement report message comprises sending orders to the target cell to become the serving cell for the user equipment (UE) before receiving an active set update complete message from the UE.

4. The method of claim 1, wherein the first measurement report message is one or more of an event that requests a cell be added to the active set of the user equipment, an event that requests a cell be removed from the active set of the UE and an event that requests a cell be replaced in the active set of the UE with another cell.

5. The method of claim 1, wherein the second measurement report message is an event requesting that the serving cell be changed to the target cell.

6. The method of claim 3, further comprising re-sending the active set update message to the user equipment (UE), if a layer 2 acknowledgment of the active set update message is not received within a threshold time, via the target cell after the target cell becomes the serving cell.

7. The method of claim 2, further comprising:
    transmitting channel quality indicators (CQIs) for a source cell to a target cell before the target cell becomes the source cell; and
    transmitting CQIs for the target cell to the target cell after the target cell becomes the source cell.

8. The method of claim 1, wherein the serving cell change is an Enhanced Serving Cell Change (ESCC) procedure in a High-Speed Downlink Packet Access (HSDPA) system.

9. A radio network controller for minimizing call drops during a serving cell change, comprising:
    a processor;
    memory in electronic communication with the processor;
    instructions stored in the memory, the instructions being executable by the processor to:
        receive a first measurement report message from a user equipment (UE) requesting a change to an active set of the UE;
        receive a second measurement report message from the UE, wherein the second measurement report message includes indicating a change of a best cell and requesting a change of a serving cell to a target cell; and
        process the second measurement report message before completely processing the first measurement report message in response to receiving the second measurement report message to allow the UE to receive user data or control data through the target cell.

10. The radio network controller of claim 9, further comprising instructions executable to send an active set update message to the user equipment (UE) based on the first measurement report message.

11. The radio network controller of claim 10, wherein the instructions executable to process the second measurement report message comprise instructions executable to send orders to the target cell to become the serving cell for the user equipment (UE) before receiving an active set update complete message from the UE.

12. The radio network controller of claim 9, wherein the first measurement report message is one or more of an event that requests a cell be added to the active set of the user equipment (UE), an event that requests a cell be removed from the active set of the UE and an event that requests a cell be replaced in the active set of the UE with another cell.

13. The radio network controller of claim 9, wherein the second measurement report message is an event 1D requesting that the serving cell be changed to the target cell.

14. The radio network controller of claim 11, further comprising instructions executable to re-send the active set update message to the user equipment (UE), if a layer 2 acknowledgment of the active set update message is not received within a threshold time, via the target cell after the target cell becomes the serving cell.

15. The radio network controller of claim 10, further comprising:
    transmitting channel quality indicators (CQIs) for a source cell to a target cell before the target cell becomes the source cell; and
    transmitting CQIs for the target cell to the target cell after the target cell becomes the source cell.

16. The radio network controller of claim 9, wherein the serving cell change is an Enhanced Serving Cell Change (ESCC) procedure in a High-Speed Downlink Packet Access (HSDPA) system.

17. A radio network controller for minimizing call drops during a serving cell change, comprising:
    means for receiving a first measurement report message from a user equipment (UE) requesting a change to an active set of the UE;
    means for receiving a second measurement report message from the UE, wherein the second measurement report message includes indicating a change of a best cell and requesting a change of a serving cell to a target cell; and
    means for processing the second measurement report message before completely processing the first measurement report message in response to receiving the second measurement report message to allow the UE to receive user data or control data through the target cell.

18. The radio network controller of claim 17, further comprising means for sending an active set update message to the user equipment (UE) based on the first measurement report message.

19. The radio network controller of claim 18, wherein the means for processing the second measurement report message comprise means for sending orders to the target cell to become the serving cell for the user equipment (UE) before receiving an active set update complete message from the UE.

20. The radio network controller of claim 17, wherein the first measurement report message is one or more of an event that requests a cell be added to the active set of the user equipment (UE), an event that requests a cell be removed from the active set of the UE and an event that requests a cell be replaced in the active set of the UE with another cell.

21. The radio network controller of claim 17, wherein the second measurement report message is an event requesting that the serving cell be changed to the target cell.

22. The radio network controller of claim 19, further comprising means for re-sending the active set update message to the user equipment (UE), if a layer 2 acknowledgment of the active set update message is not received within a threshold time, via the target cell after the target cell becomes the serving cell.

23. The radio network controller of claim 18, further comprising:
transmitting channel quality indicators (CQIs) for a source cell to a target cell before the target cell becomes the source cell; and
transmitting CQIs for the target cell to the target cell after the target cell becomes the source cell.

24. A computer-program product for minimizing call drops during a serving cell change, the computer-program product comprising a non-transitory computer-readable medium having instructions thereon, the instructions comprising:
code for causing a radio network controller to receive a first measurement report message from a user equipment (UE) requesting a change to an active set of the UE;
code for causing a radio network controller to receive a second measurement report message from the UE, wherein the second measurement report message includes indicating a change of a best cell and requesting a change of a serving cell to a target cell; and
code for causing a radio network controller to process the second measurement report message before completely processing the first measurement report message in response to receiving the second measurement report message to allow the UE receive user data or control data through the target cell.

25. The computer-program product of claim 24, further comprising code for causing a radio network controller to send an active set update message to the user equipment (UE) based on the first measurement report message.

26. The computer-program product of claim 25, wherein the code for causing a radio network controller to process the second measurement report message comprise code for sending orders to the target cell to become the serving cell for the user equipment (UE) before receiving an active set update complete message from the UE.

27. The computer-program product of claim 24, wherein the first measurement report message is one or more of an event that requests a cell be added to the active set of the user equipment (UE), an event that requests a cell be removed from the active set of the UE and an event that requests a cell be replaced in the active set of the UE with another cell.

28. The computer-program product of claim 24, wherein the second measurement report message is an event requesting that the serving cell be changed to the target cell.

29. The computer-program product of claim 26, further comprising code for causing a radio network controller to re-send the active set update message to the user equipment (UE), if a layer 2 acknowledgment of the active set update message is not received within a threshold time, via the target cell after the target cell becomes the serving cell.

30. The computer-program product of claim 25, further comprising code for:
transmitting channel quality indicators (CQIs) for a source cell to a target cell before the target cell becomes the source cell; and
transmitting CQIs for the target cell to the target cell after the target cell becomes the source cell.

* * * * *